(No Model.)
F. B. RAE.
AUTOMATIC SWITCH FOR STATIONARY MOTORS.
No. 437,662. Patented Sept. 30, 1890.
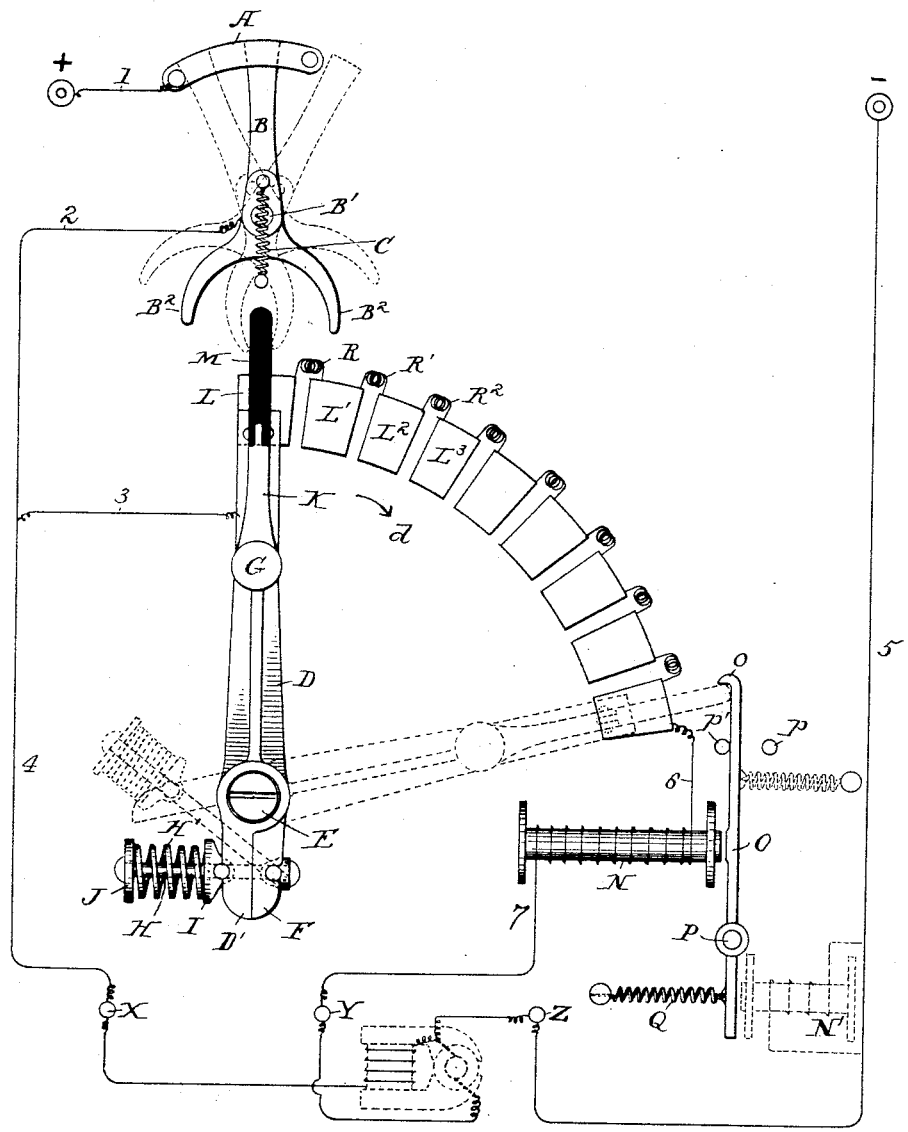
WITNESSES
D. W. Bradford
Jno. G. Hinkel
INVENTOR
Frank B. Rae.
By Foster Freeman
Attorneys

UNITED STATES PATENT OFFICE.

FRANK B. RAE, OF DETROIT, MICHIGAN, ASSIGNOR TO THE DETROIT ELECTRICAL WORKS, OF SAME PLACE.

AUTOMATIC SWITCH FOR STATIONARY MOTORS.

SPECIFICATION forming part of Letters Patent No. 437,662, dated September 30, 1890.

Application filed June 23, 1890. Serial No. 356,338. (No model.)

*To all whom it may concern:*

Be it known that I, FRANK B. RAE, a citizen of the United States, residing at Detroit, Wayne county, State of Michigan, have invented certain new and useful Improvements in Automatic Switches for Stationary Motors, of which the following is a specification.

The object of my invention is to provide an automatic switch for shunt-wound motors that shall break the connection between the main line and the motor in event of interruption or variation in the circuit; and to these ends my invention consists in a switch constructed and arranged substantially as hereinafter more fully set forth.

In the accompanying drawings I have represented diagrammatically the preferred construction and arrangement of the device in such a manner that those skilled in the art will understand the same.

In the use of electric motors for furnishing power it often happens that through some accident or otherwise the circuit is interrupted or the current materially reduced, and more especially is this liable to occur when stationary motors are operated on circuits supplying electric-railway motors, in which there may be sudden changes in the current, or the feeding-line may be broken, or the limit-switch may open at the station, or other contingency may arise which would cause the power-motor to stop or become considerably retarded, and if this happens when the motor is used with the ordinary switch the subsequent closing of the main circuit is liable to cause injury or destruction to the motor from the fact that the armature part of the motor is so connected that, practically, the whole potential of the current passes through the armature without meeting a proper resistance in the shape of counter electro-motive force, and a burn-out or injury to the armature ensues. In order to prevent such or similar accidents, I provide a switch, which upon being operated first closes the circuit upon the shunt-field direct and through a resistance in the armature-circuit, which resistance is gradually and successively cut out by a continual movement of the switch-lever, and when the lever is fully closed the circuit is direct through both the field-coils and armature of the motor and the switch is locked or held in place automatically as long as the current is flowing within its normal limits. I use an electro-magnet, which is connected in the armature-circuit, for holding the switch in position, and if for any cause the circuit is interrupted or materially lessened the magnet loses its attractive force and releases the switch-lever, which is operated by a spring or otherwise to return to its normal position, and in doing this I preferably so arrange the switch-lever that it will automatically operate a circuit-breaking switch to entirely disconnect the motor from the feeding-circuit. While this may be accomplished in various ways and by the use of various forms of mechanism, I have indicated diagrammatically, in the annexed drawings, the preferred construction and arrangement of parts for accomplishing this result.

In the drawings, the characters + and − represent the binding-posts of a motor to which my invention is applied, and to which posts are connected the lines from the main circuit. Connected to the + binding-post is a contact-piece A, and arranged to co-operate therewith is a break-switch B. This break-switch is shown as pivoted at B' and as having a spring C, one end of which is attached to the lever between its pivot-point and contact-point, and the other end of which is fixed below the pivot-point, and this is arranged so that if the lever B is carried past a perpendicular line in either direction the spring will tend to carry the lever to the extreme of its position on one side or the other, as indicated in the dotted lines, thus effecting a quick or snap make or break between the lever and the contact A. The lower end of the lever B is provided with two horn-like extensions $B^2$ or other similar construction, whereby it may be automatically moved in the manner hereinafter set forth.

Arranged below the circuit-breaking lever is another lever D, pivoted at E, and provided with a handle G, by which it may be conveniently manipulated. Some means should be provided for normally maintaining the lever D in a vertical position and for returning it thereto automatically when released, and I have shown a projection F upon the stationary support of the lever, to which projection a bolt H is secured, which passes through the extension D' of the lever D and is provided with a compression-spring H', held in place between the pivoted washer I and flat washer J, and operating when free to act to restore the lever D to its normal vertical position. Attached to the lever D is a contact-piece K, which presses upon the contact-blocks L L' L² L³, &c., connected in series by resistance-coils R R' R², &c. Extending upward from the lever D and firmly attached thereto, is a projection or finger M, of insulating material—such as vulcanized fiber, for instance—which finger is arranged to impinge upon the horn-like projection B² of the circuit-breaking switch B and to operate it to break the circuit, in the manner hereinafter described.

Arranged adjacent to the switch-arm and resistance-contacts is an electro-magnet N, the coils of which are connected in the armature-circuit, including the resistance devices just referred to. An armature O for this magnet is pivoted, as at P, and under the stress of a spring Q, which normally holds it against the stop $p$. When, however, the magnet is energized, the armature is attracted, and its free upper end is provided with a hooked projection $o$, which is arranged to engage with the end M of the switch-lever D and to hold said lever in the position shown in dotted lines against the stress of the spring H' when the normal current is flowing.

The electrical connections are arranged as follows: From the + binding-post a conductor 1 extends to the contact-piece A, thence through the lever B of the circuit-switch when closed to a conductor 2, from which a branch wire 3 leads to the switch-lever D, and the conductor 4, connecting with the conductor 2, leads to the post X, and thence to the shunt field-coil of the motor and from the opposite shunt-connection of the motor to the post Z, and thence by a conductor 5 to the − binding-post. The circuit from the switch D, in the position shown in full lines, passes through the contacts L L', &c., and the resistance-coils R R', and by the conductor 6 through the coils of the magnet N, thence by conductor 7 to the binding-post Y, through the shunt-armature of the motor to the post Z, and thence to line. When the switch-arm D is moved to the position shown in dotted lines the resistance-coils are cut out of the armature-circuit and the current flows through the shunt field and armature in the usual manner.

While I have shown the magnet arranged in the armature shunt-circuit, it is evident that it might be arranged, and in some conditions I prefer to arrange it, in the circuit 5, as indicated in dotted lines N', when of course its operation would be the same except that it would be controlled by the full current flowing through the switch, instead of the armature-shunt current only.

Such being the general arrangement of my switch, its operation will be understood to be as follows: In the neutral position the lever D is perpendicular and the right-hand horn projection B² of the switch B rests against the insulating-piece M, and a movement of the switch in the direction of the arrow $d$ carries the switch-arm B past the center of its pivot toward the left and the spring C continues the movement, closing the circuit at the contact A. This energizes the shunt field-coil of the motor, the circuit being complete from the circuit-closer, through the conductors 2 4 and the binding-post X, and the armature-current passes through the branch conductor 3, the resistance-blocks R R', more or less, thence around the coils of the magnet to the binding-post Y of the motor. The continued movement of the lever cuts out the resistance devices until it reaches the position shown in dotted lines, when all of the resistance devices are out of the armature-circuit and the lever D is locked by the hook $o$ of the armature O, and the magnet N, whether in the armature-circuit or the main circuit, holds it into position under normal currents. If, however, from any cause the main circuit is interrupted or falls below a given strength, the armature will be retracted by its spring Q, releasing the switch-arm D, which will fly back to its upright position under the influence of the spring H', and when the lever nearly reaches its limit the projection M will strike the left-hand horn B² of the switch-lever B and carry this lever past the central line toward the right, when the spring C will continue its movement, breaking the main circuit at A. If it is desired to stop the motor at any time when a normal current is flowing, the armature O may be pulled away manually, and the same operations will automatically cut out the circuit and leave the switch in condition to receive the circuit properly when again applied to the motor; or, if desired, a supplemental circuit-breaking switch may be arranged in the conductor 5 or other convenient position. In all events, whenever the strength of the current falls below its normal condition through accident or through cutting out of the motor the switch D will automatically assume its neutral upright position and break the circuit at the contact A, and thus if by any chance the circuit is closed through the motor it will always find the resistance included in the path of the armature-circuit until the switch D has been properly operated and locked in position, and this will give the armature time to acquire a proper speed to produce sufficient counter electro-motive force to prevent injury or destruction thereto.

What I claim is—

1. In a switch device for electric motors, the combination of the break-switch in the main circuit including the field-magnets of the motor, the shunt for the armature including a series of resistances, a switch-lever in said shunt-circuit arranged to operate the break-switch to open and close the main circuit, and to gradually cut out or in the resistance of the armature-circuit as it is moved to stop or start the motor, substantially as described.

2. In an automatic switch device for electric motors, the combination, with the break-switch for the main line including the field-magnet coils of the motor, the said switch consisting of a spring-actuated arm having extensions, of a switch-lever in the shunt including the armature of the motor and resistances, the switch-lever being provided with an extension to engage the extension of the break-switch, substantially as described.

3. In an automatic switch device for electric motors, the combination of a spring-controlled break-switch in the main line including the field-magnet coils of the motor, a switch-lever in the armature-circuit including the resistances, and an extension on said lever to operate the break-switch at the commencement or ending of its movement, substantially as described.

4. In an automatic switch device for electric motors, the combination, with a break-switch in the main circuit, of a switch-lever in the armature-circuit controlling the resistances therein, an extension on said lever operating the break-switch, and an electro-magnet and armature controlling the switch-lever, substantially as described.

5. In an automatic switch device for electric motors, the combination, with a pivoted break-switch having extensions, of a pivoted switch-lever having an extension engaging the extensions of the break-switch, an electro-magnet controlling the movement of said switch-lever, and a spring for retracting it to its normal position, substantially as described.

6. In an automatic switch device, the combination, with the pivoted break-switch having extensions, the pivoted switch-lever having an extension engaging the break-switch, a shunt armature-circuit for the motor including a series of resistances, an electro-magnet included in said circuit, an armature for the magnet provided with a catch engaging the switch-lever, and a spring for retracting the switch-lever, substantially as described.

In testimony whereof I have signed my name to this specification in the presence of two subscribing witnesses.

FRANK B. RAE.

Witnesses:
JAMES WHITTEMORE,
L. J. WHITTEMORE.